(12) United States Patent
Aebischer et al.

(10) Patent No.: US 6,516,286 B1
(45) Date of Patent: Feb. 4, 2003

(54) METHOD FOR MEASURING THE DISTANCE TO AT LEAST ONE TARGET

(75) Inventors: Beat Aebischer, Heerbrugg (CH); Christian Betschon, Heiden (CH); Bernhard Gächter, Balgach (CH); Georg Orawez, Diepoldsau (CH); Ernst Ramseier, Widnau (CH); Esther Rutishauser, Wolfhalden (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 09/542,879

(22) Filed: Apr. 4, 2000

(51) Int. Cl.$^7$ ............................................... G01B 11/14
(52) U.S. Cl. ....................................... 702/158; 702/159
(58) Field of Search ................................ 356/1, 5, 373; 364/569; 396/104; 280/561; 354/403; 250/201, 560; 73/861.28

(56) References Cited

U.S. PATENT DOCUMENTS

| | | | | |
|---|---|---|---|---|
| 4,139,301 A | * | 2/1979 | Chaborski | 356/5 |
| 4,464,048 A | * | 8/1984 | Farlow | 356/5 |
| 4,538,907 A | * | 9/1985 | Rocchi | 356/1 |
| 4,637,727 A | * | 1/1987 | Ahola et al. | 356/373 |
| 4,734,587 A | * | 3/1988 | Schwarte | 250/560 |
| 4,787,252 A | * | 11/1988 | Jacobson et al. | 73/861.28 |
| 4,888,477 A | * | 12/1989 | Nankivil | 250/201 |
| 4,976,537 A | * | 12/1990 | Kotani et al. | 356/1 |
| 5,060,003 A | * | 10/1991 | Kotani et al. | 354/403 |
| 5,179,286 A | * | 1/1993 | Akasu | 280/561 |
| 5,191,384 A | * | 3/1993 | Nakanishi et al. | 356/1 |
| 5,805,468 A | * | 9/1998 | Blohbaum | 364/569 |
| 6,173,122 B1 | * | 1/2001 | Matsumoto et al. | 396/104 |

FOREIGN PATENT DOCUMENTS

| | | | | |
|---|---|---|---|---|
| DE | 0 534 056 A1 | * | 3/1993 | G01S/13/58 |
| DE | 19517001 | | 11/1996 | |
| DE | 195 17 001 A | * | 11/1996 | G01S/17/10 |
| DE | 0 854 368 A2 | * | 7/1998 | G01S/17/32 |
| EP | 0312224 | | 4/1989 | |
| EP | 0 312 244 A1 | * | 4/1989 | G01F/1/712 |
| EP | 0534056 | | 3/1993 | |
| EP | 0797105 | | 9/1997 | |
| EP | 0854368 | | 7/1998 | |

* cited by examiner

Primary Examiner—John S. Hilten
Assistant Examiner—Douglas N Washburn
(74) Attorney, Agent, or Firm—Rothwell, Figg, Ernst & Manbeck PC

(57) ABSTRACT

To measure the distance to targets, local maxima exceeding a threshold (ε) and being associated with a correlation function (f) are determined, the reference values of which are obtained from scalar products of a received signal (e), produced by reflections of an optical pulse by the targets, and number of comparison functions, copies of a reference function (r) which are shifted as a function of time, and the transit times of the reflections are derived from the time-related shifts of the corresponding comparison functions. By interpolation with respect to the time-related shifts or optimization thereof, for example by adjusting them so that the orthogonal distance of the received signal (e) from the vector space which is spanned by the corresponding comparison functions is a minimum, the transit times can be determined even more accurately.

19 Claims, 4 Drawing Sheets

METHOD FOR MEASURING THE DISTANCE TO AT LEAST ONE TARGET

FIELD OF THE INVENTION

The invention relates to a method for measuring the distance to at least one target. Such methods are used in particular in distance-measuring devices as used, for example, in the surveying of buildings and lots.

DESCRIPTION OF THE PRIOR ART

DE-A-41 33 196 discloses a method of the generic type in which an input signal is composed of signals which are attributable to a plurality of optical pulses which are reflected by a target whose distance is to be determined and which, in order to improve the time resolution, were each emitted with different internal delays. From the time when said input signal reaches its maximum, the transit time is then derived and the distance is calculated therefrom.

This method has the disadvantage that the determination of the distance is based in the end on an individual measured value or at best on a small number of measured values. If these individual or few measured values are falsified by noise, which cannot be ruled out, the result may likewise contain a large error.

Although DE-A-36 20 226 discloses that the noise of the input signal can be reduced by repeated emission of the pulse and addition of those scanned values of the received signal which correspond to the same transit times, this requires a large number of pulses and hence longer measuring times, in particular if a high resolution is also to be achieved.

SUMMARY OF THE INVENTION

It is the object of the invention to provide a method of the generic type in which the relationship between the achievable accuracy and the required effort, in particular the number of pulses required and hence the measuring time required, is improved, and high accuracy of the distance measurement is achieved in particular with a small number of pulses or even with a single pulse.

The invention provides a method in which the total shape of the input signal is used for the determination of the transit time. This greatly reduces the dependence of the result on any individual scans falsified by noise. The distance can be determined with great accuracy and low uncertainty of measurement simply from the evaluation of the input signal resulting from a single optical pulse. Moreover, it is readily possible with the method according to the invention to detect and to distinguish a plurality of targets with a single measurement. This is important especially in the case of long measuring distances where, owing to the widening of the beam, the latter need no longer be concentrated on a single target.

BRIEF DESCRIPTION OF THE DRAWINGS

Below, the invention is explained in more detail with reference to Figures which represent only one embodiment.

DESCRIPTION OF THE PREFERRED EMBODIMENTS

Figure 1:
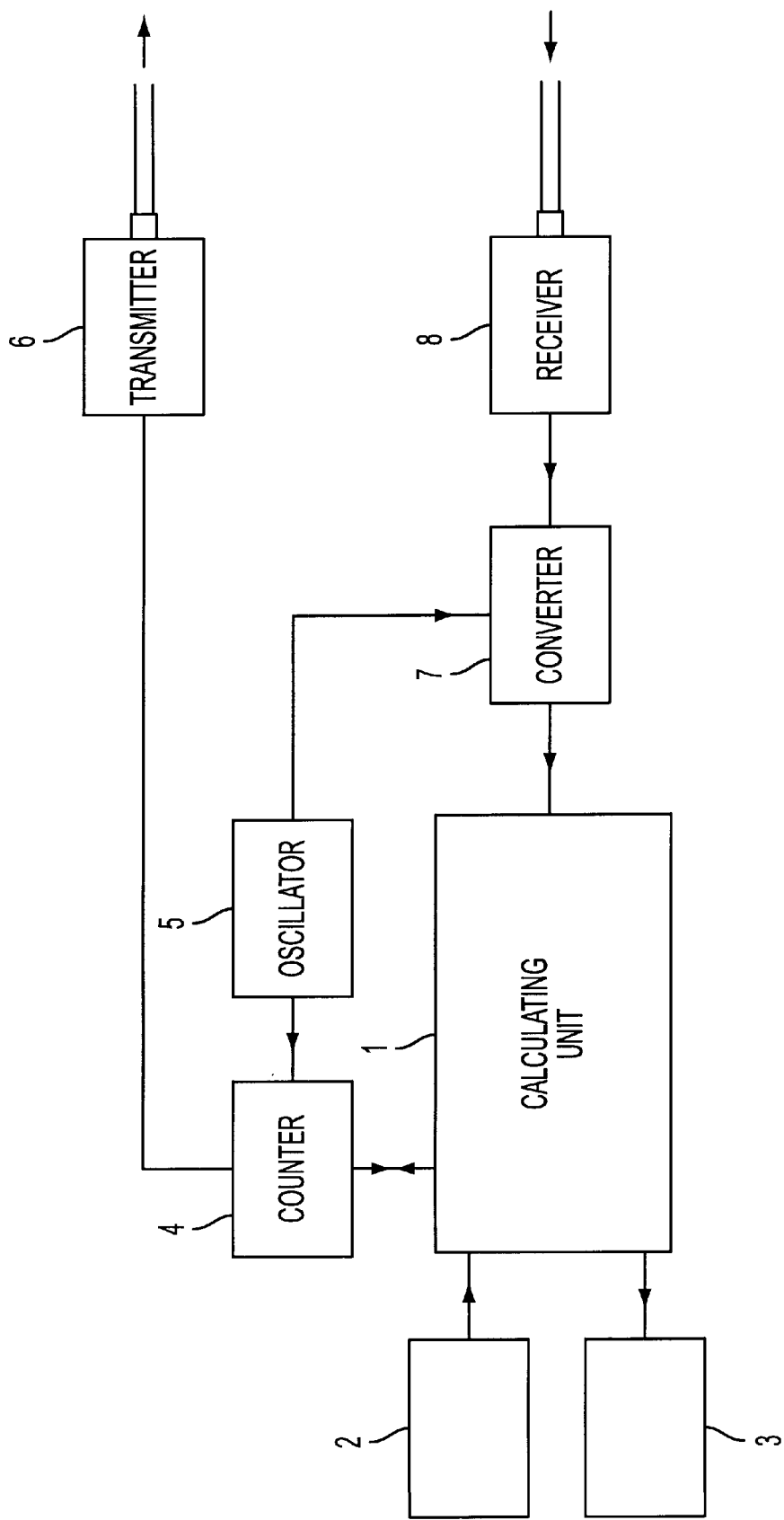
FIG. 1 shows a block diagram of an apparatus suitable for carrying out the method according to the invention.

The apparatus according to FIG. 1 comprises a calculating unit 1 which serves both for controlling the apparatus and for evaluating the measured values. An input unit 2 for inputting commands, for example a keyboard, and an output unit 3 for outputting results, etc., for example a liquid crystal display, are connected to said calculating unit 1. A counter 4 which counts the cycles of the output signal of an oscillator 5 is connected to the calculating unit 1 and also transmits signals to a transmitter 6. The oscillator 5 also controls an analogue/digital converter 7 which is down-circuit of a receiver 8 and is also connected to an input of the calculating unit 1.

Figure 2A:
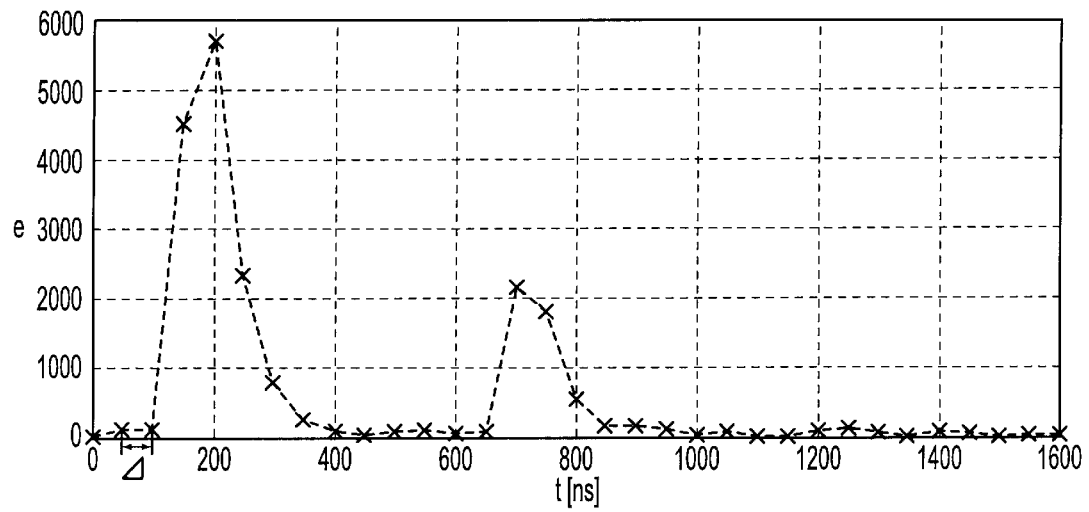
FIG. 2 shows, arranged one under the other, a received signal, a reference function and a correlation function formed by scalar products between the received signal and comparison functions produced by shifts of the reference function based on time, in each case as a function of time, FIG. 3a schematically shows a setup for determining the reference function according to a first method and FIG. 3b schematically shows a setup for determining the reference function according to a second method.
Figure 2B:
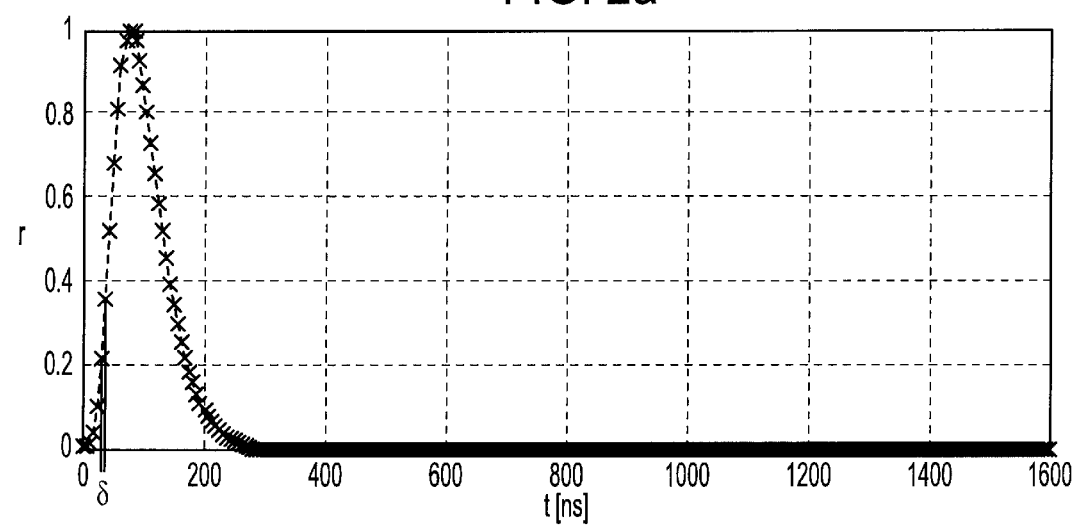
Figure 2C:
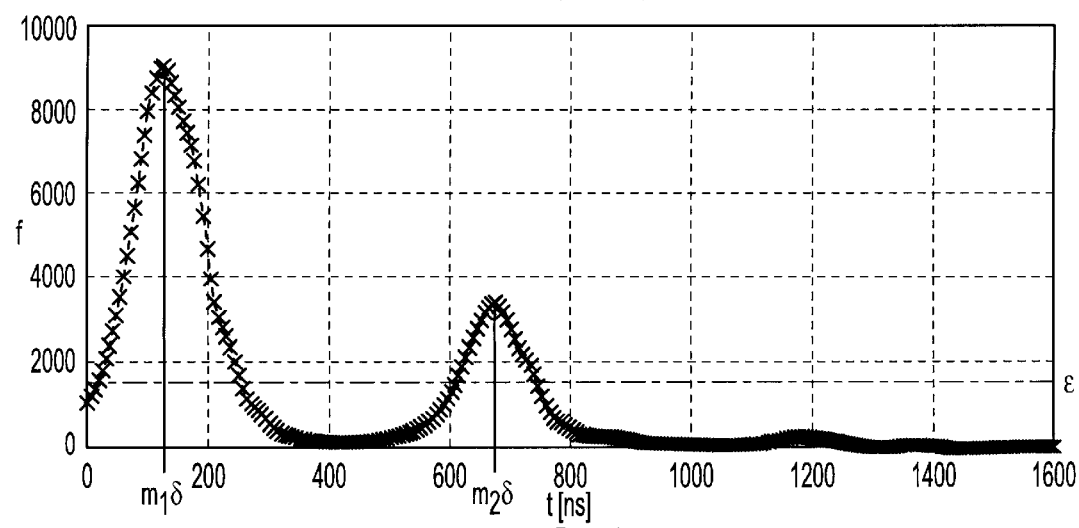

The oscillator 5 generates an electrical signal with a frequency of, in the example, 20 MHz, i.e. with a period of 50 ns. After, for example, 2000 cycles in each case, the counter 4 transmits a signal to the transmitter 6, which signal causes said transmitter to emit a short optical pulse. The pulse is reflected by a target or by a plurality of targets which each intersect a part of the light cone, and the reflections are picked up by the receiver 8 and converted into an electrical received signal e (FIG. 2, top) . Owing to the limited frequency response of the receiver and of the electronics connected thereto, the received signal e may be relatively greatly expanded as a function of time. It is scanned by the A/D converter 7, which as mentioned is controlled by the oscillator 5, at intervals of a scanning increment $\Delta=50$ ns. The corresponding values $e(n\Delta), n=0, \ldots, N$, where N=32 in the example shown, are stored by the calculating unit 1. The memory address is derived in each case from the number n which is delivered by the counter 4 and is a measure of the time of scanning, based on the signal which has triggered the emission of the optical pulse by the transmitter 6.

For the evaluation in the calculating unit 1, a reference function r (FIG. 2, center) which was determined in a manner described in more detail further below is used. Values of the reference function r are used at points which follow one another with an interval of specific reference increments. The reference increments preferably correspond in each case to a fixed time difference $\delta$, for example a fraction $\delta=\Delta/M$ of the scanning increment $\Delta$, where M is an integer >1; in the specific case described, M is 8. The values $r(i\delta), i=0, \ldots, MN$ are permanently stored in the calculating unit 1. Below a relatively small carrier region, the values are equal to zero; above this region, they are likewise equal to zero or decrease exponentially so that the reference function r can be continued beyond the interval [0, N$\Delta$], in the simplest case by setting $r(i\delta)=0$ outside said region. Comparison functions $v_m, m=0, \ldots, MN$ are now generated in succession from the reference function r by producing in each case a copy of the reference function r shifted by a fixed time interval. The time interval is in each case a multiple m$\delta$ of a lower case interval corresponding here to the reference increment $\delta$. The comparison functions $v_m$ can, if required, also be modified in other ways, for example multiplied by a suitable factor for compensating the beam expansion. Apart from any modifications of this type, it is true that $$v_m(i\delta)=r((i-m)\delta). \tag{1}$$

With each comparison function $v_m$, a similarity function is calculated directly as a measure of the similarity between said comparison function and the received signal e. This is a correlation function f, which corresponds to a scalar product between the two functions. For those times when there is no scanning value of e but only one for $v_m$, i.e. where i mod M is≠0, the value e(iδ) is set=0. The result is the correlation function $$f(m\delta) = \sum_{i=0}^{N} e(iM\delta)v_m(iM\delta) = \sum_{i=0}^{N} e(i\Delta)r(i\Delta - m\delta), \quad (2)$$

for m=0, . . . ,MN,a shown in FIG. 2, bottom.

Those comparison functions which are particularly similar to the received signal e and make a larger contribution to said received signal are now determined by determining those local maxima of function f at which the value of said function exceeds a specific threshold ε which can be adjusted to the circumstances of the measurements, in particular the extent of expected disturbances. The corresponding times $m_k\delta$, k=1, . . . ,K represent approximate reception times of reflections of the optical pulse by targets 1, . . . ,K. In the example shown in FIG. 2, K is 2, but larger numbers are also possible.

By interpolation with respect to the times of the maxima, the reception time for achieving a higher resolution as a function of time can be determined more accurately. In the simplest procedure, which is suitable in particular when the maxima are relatively far apart and the comparison functions do not overlap or overlap only slightly —i.e. the reflections at the various targets are not superposed or are scarcely superposed —the individual maxima are treated separately and the correlation function f is interpolated in each case by an interpolation function, and the time $T_k$ when said interpolation function reaches its maximum is then determined as an exact reception time. If, for example, it is a quadratic function which is defined by the points $((m_k-1)\delta, f((m_k-1)\delta))$, $(m_k\delta, f(m_k\delta))$ and $((m_k+1)\delta, f((m_k+1)\delta))$, this leads to $$T_k = m_k\delta + \frac{\delta}{2} \frac{f((m_k+1)\delta) - f((m_k-1)\delta)}{2f(m_k\delta) - f((m_k-1)\delta) - f((m_k+1)\delta)} \quad (3)$$

According to another procedure, the reception times are determined more accurately by adjusting the previously determined comparison functions $V_{mk}$, k=1, . . . K by small time-related shifts so that they optimally approximate to the received signal e. Using the formulation $$e(n\Delta) = \sum_{k=1}^{K} a_k v_{mk}(n\Delta) \quad (4)$$

and the column vectors $\underline{e}=(e(n\Delta), n=0, \ldots, N)$ and correspondingly $\underline{a}=(a_k, k=1, \ldots, K)$, the linear equation $$\underline{e}=V\underline{a} \quad (5)$$

is obtained, where $V^n_k=v_{mk}(n\Delta)=r(n\Delta-m_k\delta)$, n=0, . . . ,N, k=1, . . . ,K, i.e.

$$V = \begin{bmatrix} v_{m1}(0) & \ldots & v_{mk}(0) \\ M & M & \\ v_{m1}(N\Delta) & \ldots & v_{mk}(N\Delta) \end{bmatrix} = \begin{bmatrix} r(-m_1\delta) & \ldots & r(-m_k\delta) \\ M & M & \\ v_{m1}(N\Delta-m_1\delta) & \ldots & r(N\Delta-m_k\delta) \end{bmatrix} \quad (6)$$

The expression can be generalized to continuous time variables. For this purpose, starting from reference values, the reference function r can be supplemented to give a function which is continuous, i.e. defined over the total interval [0, NΔ), and which as far as possible is continuously differentiable, preferably continuously differentiable at least once. This can be done, for example, by means of quadratic spline functions. The reference function r can be extended beyond the stated interval by setting it equal to zero there. Alternatively, it is also possible to assume an exponential decay. The comparison functions $v_m$ can then be replaced at the stated interval likewise by continuous functions $\bar{v}_T$, so that the discrete variables m are replaced by a real variable T:

$$\bar{v}_T(n\Delta)=r(n\Delta-T). \quad (7)$$

Thus, V, too, is expanded to give a function of real variables:

$$V(\underline{T})^n_k=\bar{v}_{Tk}(n\Delta)=r(n\Delta-T_k), n=0, \ldots, N, k-1, \ldots, K, \quad (8)$$

where $T_1, \ldots T_K$ together give a vector $\underline{T}$.

Starting from the approximate initial values $T_k=m_k\delta$, it is now possible to determine exact reception times by optimizing the approximation of $\underline{e}$ by variation of $\underline{a}$ and $\underline{T}$. For this purpose, the minimum point of the mean square distance between $\underline{e}$ and $V(\underline{T})$ a $$F(\underline{a}, \underline{T})=\|\underline{e}-V(\underline{T})\underline{a}\| \quad (9)$$

is determined. First, the optimization is performed using $\underline{a}$. $F(\underline{a}, \underline{T})$ is minimum for $$\underline{a}=V(\underline{T})^+\underline{e} \quad (10)$$

where $V(\underline{T})^+$ is the pseudoinverse of the matrix $V(\underline{T})$. The matrix $V(\underline{T})^+$ reproduces vectors in the image space of $V(\underline{T})$ in each case on its uniquely determined original image in the complement of the null space of $V(\underline{T})$, whereas it reproduces vectors in the complement of the image space on 0 (in this context, see J. Stör: Einführung in die numerische Mathematik I [Introduction to Numerical Mathematics I], HeidelbergerTB 105, Springer-Verlag 1976, page 184 et seq.)

For the specific calculation $V(\underline{T})^+\underline{e}$, however, it is not necessary to determine the matrix $V(\underline{T})^+$. It can be done in an efficient manner by known numerical methods such as QR factorization by means of the Housholder Transformation (cf. for example G. H. Golub and Ch. F. van Loan: Matrix Computations, North Oxford Academic, London 1986, Ch. 6.1, 6.2).

(9) can now be expressed as $$F(T)=\|\underline{e}-V(\underline{T})V(T)^+\underline{e}\|. \quad (11)$$

$V(\underline{T})V(\underline{T})^+$ is the projection $P(\underline{T})$ onto the vector space spanned by the comparison functions $\bar{v}_{Tk}$, k=1, . . . ,K, so that (9) corresponds to $$F(\underline{T})=\|\underline{e}-P(\underline{T})\underline{e}\|=\|(1-P(\underline{T}))\underline{e}\|, \quad (12)$$

i.e. the minimum of the distance between $\underline{e}$ and its projection onto the vector space spanned by $\bar{v}_{Tk}$, k=1, . . . ,K, as a function of $\underline{T}=(T_1, \ldots, T_K)$, is required.

The minimum of the nonlinear function F ($\underline{T}$) can be determined by known numerical methods. Examples are the steepest slope method or the determination of a zero point of the gradient F by means of an iteration of linear approximations (Newton's method). In this context, see, for example, E. Stiefel: Einführung in die numerische Mathematik [Introduction to Numerical Mathematics], Teubner Studienbücher Mathematik, B. G. Teubner 1976, page 83 et seq. However, methods with better conversion behaviour are preferred, as described, for example, in the following articles: D. W. Marquardt: An Algorithm for Least-Squares Estimation of Nonlinear Parameters, SIAM Journal on Applied Mathematics 11 (1963), 431–441, and K. Levenberg: A Method for the Solution of Certain Non-Linear Problems in Least Squares, Quarterly of Applied Mathematics 2 (1944), 164–168.

From the reception time $T_k$, it is now possible, in each case by addition of a fixed term $T_0$ dependent on the determination of the zero point, to determine the transit time $L_k = T_0 + T_k$ of the optical pulse and, from this, the distance $x_k$ of the k th target in a very simple manner according to $$x_k = \frac{c}{2} L_k \tag{13}$$

where c denotes the velocity of light.

With $T_k$,k=1, . . . , K, V($\underline{T}$) is also known, so that, using (10), it is also possible to calculate the coefficients $a_k$,k=1, . . . ,K, which weight the targets 1, . . . ,K.

Figure 3A:
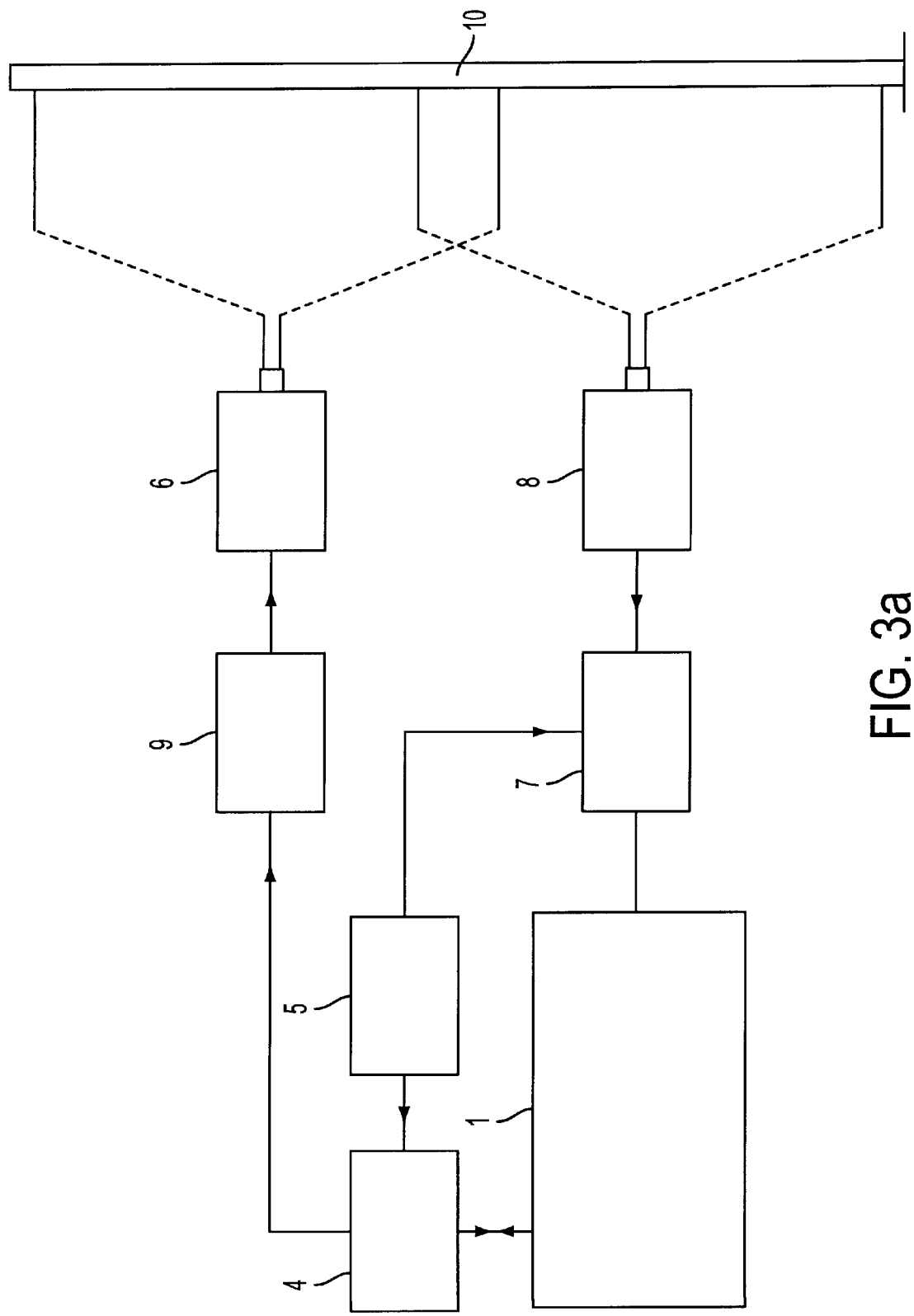

The reference function can be determined in various ways. According to FIG. 3a, this is performed by means of a setup comprising important parts of the apparatus according to FIG. 1. Said setup comprises the calculating unit 1, the counter 4 and the oscillator 5 as well as the transmitter 6 and the receiver 8 with the down-circuit A/D converter 7. A time-lag element 9 is inserted between the counter 4 and the transmitter 6. A reference target 10, for example a panel, is also provided and is mounted a specific distance from the transmitter 6 and receiver 8.

After every 2000 cycles of the oscillator 5, the counter 4 transmits a signal to the time-lag element 9 which, after a specific delay, transmits it onto the transmitter 6 and triggers the emission of an optical pulse by said transmitter. The optical pulse reflected by the reference target 10 generates at the output of the receiver 8 a reference received signal which is scanned in the A/D converter 7 at time intervals which correspond to the scanning increment $\Delta$. The reference values thus determined reach the calculating unit 1 and are each stored there, assigned to a specific scanning time.

With each triggering of the transmitter 6 via the time-lag element 9, the signal delay is changed to the next delay value $\tau_i$,i=0,I−1,$\tau_0$ < . . . < $\tau_{I-1}$—the initial value is $\tau_0$=0—which is reflected in corresponding time-related shifts of the reference received signal. Since the scanning of said received signal under control by the oscillator 5 takes place without a delay, this corresponds in each case —based on the initial value —to an advance of the scanning time by the delay value $\tau_i$. After the scanning and storage of I signals, the reference function r is formed by assigning each reference value to its scanning time. For the delay values, $\tau_i = i\delta$, i=0−, . . . ,I−1 may be chosen. The reference values then follow one another at fixed intervals which correspond to the reference increment $\delta$. If this is not the case, the values of the reference function r at the points corresponding to integral multiples of the reference increment must be determined by interpolation for use in (1). The procedure essentially corresponds to that used in DE-A-42 33 196 in the measurement of the distance of a target. It is obvious that, instead of the signal which triggers the emission of an optical pulse by the transmitter 6, the same effect can be achieved by delaying the reference received signal.

To increase the signal-to-noise ratio, it is also possible to sum or average the results of a plurality of successively performed measurements in the determination of the reference function r, similarly to the procedure described according to DE-A-36 20 226 in connection with the measurement of the distance of a target. The summing can be carried out digitally, but it is also possible to store and to sum the measured values in analog form, for example as electric charges, and to convert the sum itself into digital form, as described in a similar context in DE-A-44 40 613.

Both methods, namely the refinement of the time resolution and the improvement of the signal-to-noise ratio, as described above for the measurement of the reference received signal, can incidentally also be used in normal measurement, either individually or together, for improving the time resolution and the signal-to-noise ratio of the received signal e, if the situation that the number of required pulses is increased as a result does not have any major disadvantages. The apparatus according to FIG. 1 should then be supplemented appropriately.

Figure 3B:
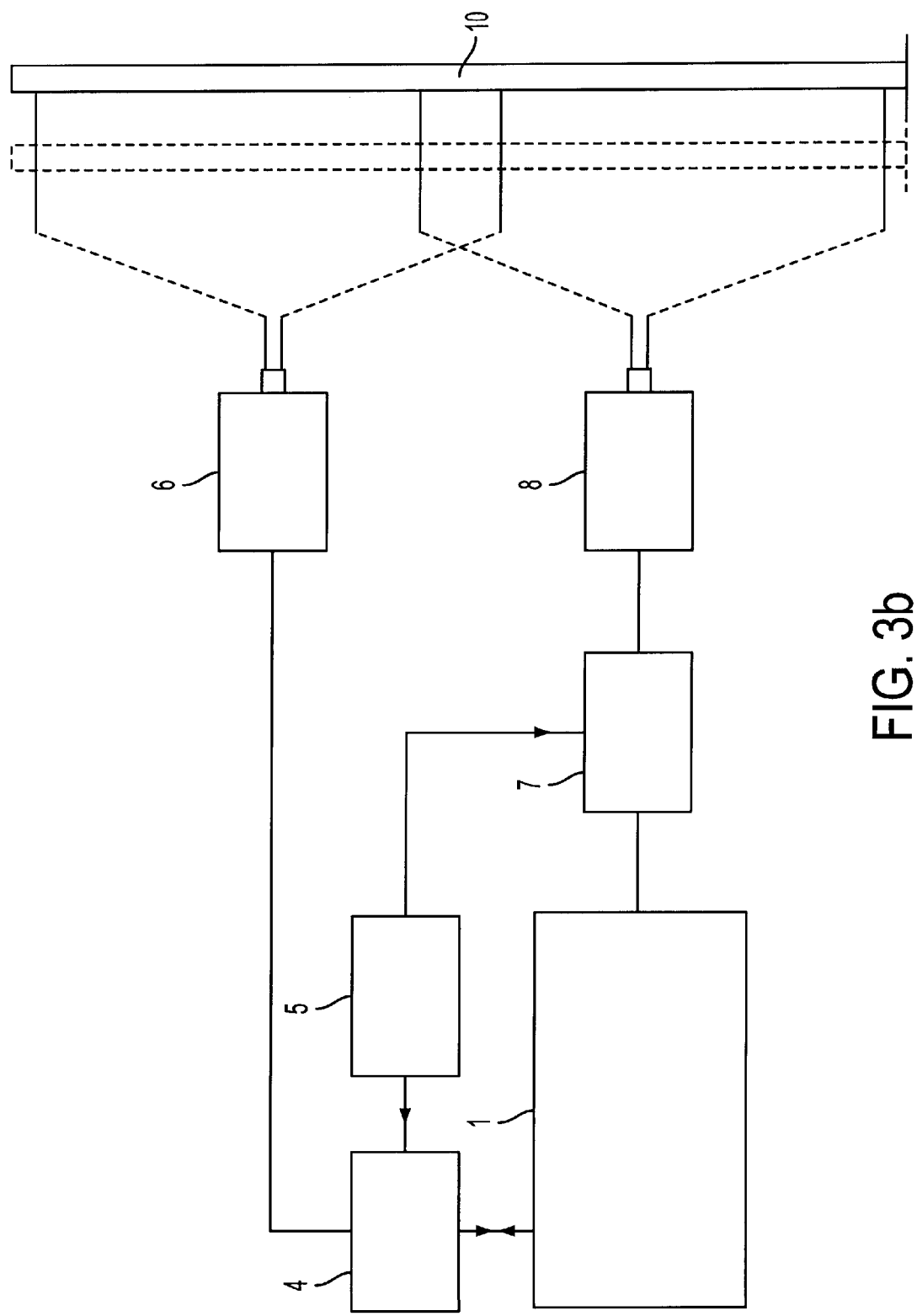

Another possibility, shown in FIG. 3b, for improving the resolution of the reference received signal as a function of time, consists in changing the distance of the reference target 10. With an initial value d, it can be measured in succession at distances d+c$\tau_i$/2, i=0, . . . , I−1. This also leads to delays of the received signal without the necessity of using the time-lag element. However, it should be borne in mind that the intensity of the received signal decreases approximately proportionately to the square of the distance of the reference target 10, owing to the beam expansion.

Instead of the direct determination of the reference values of the reference function r as measured values or sums of measured values, however, it is also possible to use a more complicated procedure. For this purpose, a formulation which reduces the amount of possible reference functions r to a vector space of finite dimensions is postulated. Thus, it may be assumed, for example, that the reference function r is in the space of the quadratic spline function with a fixed number of equidistant reference points. Exponential decay can also be taken into account. The reference function r is then fixed by a finite number of real parameters.

To determine these parameters, the scanning values of the time-shifted reference received signals $e^n_i$,n=0, . . . ,N, i=0, . . . ,I−1, where $e^n_i$ represents the value for a delay $\tau_i$ and a scanning time n$\Delta$, are approximated as exactly as possible by a superposition of correspondingly time-shifted copies of the reference function. For this purpose, the minimum of the mean square distance according to the expression $$\sum_{n=C}^{N} \sum_{i=C}^{T-1} w_i^n (e_i^n - a_i r(n\Delta - \tau_i))^2 \tag{14}$$

is found as a function of the parameters described in the reference function r, where the w$^n$i,n=0, . . . ,N,i=0, . . . ,I−1 are weighting coefficients, all of which are set equal to 1 in the simplest case. If the delay is produced by the time-lag element 9, $a_i$ can be set=1 for i=0, . . . ,I−1. If it is produced by shifting the reference target 10, the coefficients ai must take into account the effect of the distance on the intensity of the input signal. However, it is also possible to consider the coefficients $a_i$ likewise as variables and to determine them from the minimization of (14). The delay values may be multiples of the reference increment but may also assume other, nonequidistant values.

List of Reference Symbols

1 Calculating unit
2 Input unit
3 Output unit
4 Counter
5 Oscillator
6 Transmitter 7 Analog/digital converter
8 Receiver
9 Time-lag element
10 Reference target
e Received signal
r Reference function
f Correlation function
ΔScanning increment
δReference increment

What is claimed is:

1. A method for measuring the distance to at least one target comprising:

sending, by a transmitter, at least one optical pulse toward the target;

picking up, by a receiver, reflections of the at least one pulse as input signals;

converting the reflections of the at least one pulse into a received signal (e);

storing the reflections of the at least one pulse determining at least one reception time by comparing the received signal (e) with comparison functions, which are copies, shifted by various time intervals, of a previously determined and stored reference function (r), and approximating the at least one reception time from the time intervals which correspond to the most similar comparison functions;

determining a transit time from the reception time of the input signal; and calculating the distance from said reception time, wherein said reference function (r) is previously determined by sending at least one optical reference pulse toward a reference target and scanning a received reference signal corresponding to the at least one reference pulse to determine reference values of the reference function (r), and thereafter, the reference function (r) is stored.

2. The method as claimed in claim 1 wherein the at least approximate determination of the at least one reception time is based on a set of comparison functions which correspond to predetermined fixed time intervals.

3. The method as claimed in claim 2, wherein the predetermined fixed time intervals are integral multiples of a fixed basic interval.

4. The method as claimed in claim 2 wherein only those comparison functions where in each case the similarity function (f) representing a measure of similarity with the received signal (e) forms a local maximum which exceeds a specific threshold (ε) are used.

5. The method as claimed in claim 4, wherein the similarity function used is a correlation function (f).

6. The method as claimed in claim 5, wherein the function values of the correlation function are calculated in each case as the scalar product of the received signal (e) and one of the comparison functions.

7. The method as claimed in claim 2 wherein exact reception times are determined starting from the approximately determined reception times, by interpolation between the time intervals.

8. The method as claimed in claim 4, wherein the interpolation is effected by determining the local maximum of the correlation function (f) expanded between reference values to give a continuous function.

9. The method as claimed in claim 7, wherein the interpolation is carried out at least in part by minimizing the distance of the received signal (e) from a vector space which is spanned by the comparison functions corresponding to the reception times, starting from the vector space which is spanned by the comparison functions which correspond to the approximately determined reception times.

10. The method as claimed in claim 1, wherein the received signal (e) is scanned at times which in each case follow one another at intervals of a fixed scanning increment (Δ).

11. The method as claimed in claim 1, wherein the reference function (r) is determined at a number of points which follow one another at intervals of reference increments (δ).

12. The method as claimed in claim 11, wherein the reference increment (δ) corresponds in each case to the scanning increment (Δ) divided by an integer>1.

13. The method as claimed in claim 1, wherein, to improve the resolution as a function of time, the reference input signal is shifted as a function of time by various delay values.

14. The method as claimed in claim 13, wherein the shifting of the reference input signal as a function of time is effected by delaying the emission of the optical pulse by the transmitter (6) or of the reference input signal.

15. The method as claimed in claim 13, wherein the shifting of the reference input signal as a function of time is effected by changing the distance to the reference target (10).

16. The method as claimed in claim 1, wherein, to improve the signal-to-noise ratio, the emission of the optical pulse and the scanning of the reference input signal are repeated and, for the formation of the reference value of the reference function (r), the scanning values corresponding to identical transit times are summed or averaged.

17. The method as claimed in claim 10, wherein, starting from reference values, the reference function (r) is expanded by interpolation to give a continuous function preferably continuously differentiable at least once.

18. The method as claimed in claim 13, wherein, a formulation according to which the reference function (r) can be fixed by a finite number of parameters and the parameters are determined from a comparison of the reference input signal with copies of the reference function which are shifted as a function of time by the delay values is postulated for the reference function (r).

19. The method as claimed in claim 18, wherein, to determine the parameters, the distance of the reference received signal from a superposition of the copies of the reference function (r) which are shifted as a function of time by the delay values is minimized.

* * * * *